United States Patent
Kim et al.

(10) Patent No.: US 8,362,977 B2
(45) Date of Patent: Jan. 29, 2013

(54) CONTACT DEVICE, PLASMA DISPLAY INCLUDING THE SAME, AND DRIVING METHOD THEREOF

(75) Inventors: Kyong-Won Kim, Suwon-si (KR);
Hak-Cheol Yang, Suwon-si (KR);
Sung-Chun Cho, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 674 days.

(21) Appl. No.: 12/624,331

(22) Filed: Nov. 23, 2009

(65) Prior Publication Data

US 2010/0141785 A1   Jun. 10, 2010

(30) Foreign Application Priority Data

Dec. 8, 2008   (KR) .................... 10-2008-0124101

(51) Int. Cl.
*G06F 3/033*   (2006.01)
(52) U.S. Cl. ............. 345/63; 345/66; 345/41; 345/173; 345/1.3
(58) Field of Classification Search .................. None
See application file for complete search history.

(56) References Cited

U.S. PATENT DOCUMENTS

| | | | | |
|---|---|---|---|---|
| 7,999,766 B2 * | 8/2011 | Okamoto et al. | ............... | 345/60 |
| 2007/0103390 A1 * | 5/2007 | Park et al. | ............... | 345/60 |
| 2007/0164932 A1 * | 7/2007 | Moon | ............... | 345/63 |

FOREIGN PATENT DOCUMENTS

| | | |
|---|---|---|
| JP | 08-115057 | 5/1996 |
| JP | 09-090903 | 4/1997 |
| JP | 2000-020237 | 1/2000 |
| JP | 2001-318765 | 11/2001 |
| KR | 10-2006-0012200 | 2/2006 |
| KR | 10-2008-0113832 | 12/2008 |

OTHER PUBLICATIONS

Korean Notice of Allowance dated Sep. 29, 2010.

* cited by examiner

*Primary Examiner* — Muhammad N Edun
(74) *Attorney, Agent, or Firm* — Knobbe, Martens, Olson & Bear LLP

(57) ABSTRACT

A method of driving a plasma display is disclosed. In one embodiment, the method includes dividing one screen into a plurality of areas, wherein each area corresponds to at least one of the plurality of discharge cells, and wherein the plurality of areas form a detection pattern. The method also includes displaying the detection pattern in the plasma display and receiving a detection image which has been previously detected or captured, wherein detection image corresponds to at least one of the plurality of areas. The method further includes comparing the received detection image with the detection pattern and determining a position of the detected or captured area based on the comparison.

20 Claims, 9 Drawing Sheets

| Subfield | SF1 | SF2 | SF3 | SF4 | SF5 | SF6 | SF7 | SF8 | SF9 | SF10 | SF11 |
|---|---|---|---|---|---|---|---|---|---|---|---|
| Weight value | 1 | 2 | 3 | 5 | 8 | 12 | 19 | 28 | 40 | 59 | 78 |

FIG.4

| 11 | 12 | 13 | 14 | 15 | 16 | 17 | 18 |
|----|----|----|----|----|----|----|----|
| 21 | 22 | 23 | 24 | 25 | 26 | 27 | 28 |
| 31 | 32 | 33 | 34 | 35 | 36 | 37 | 38 |
| 41 | 42 | 43 | 44 | 45 | 46 | 47 | 48 |
| 51 | 52 | 53 | 54 | 55 | 56 | 57 | 58 |
| 61 | 62 | 63 | 64 | 65 | 66 | 67 | 68 |
| 71 | 72 | 73 | 74 | 75 | 76 | 77 | 78 |
| 81 | 82 | 83 | 84 | 85 | 86 | 87 | 88 |

P (rows), Q (columns)

CONTACT DEVICE, PLASMA DISPLAY INCLUDING THE SAME, AND DRIVING METHOD THEREOF

CROSS-REFERENCE TO RELATED APPLICATION

This application claims priority to and the benefit of Korean Patent Application No. 10-2008-0124101 filed in the Korean Intellectual Property Office on Dec. 8, 2008, the entire contents of which are incorporated herein by reference.

BACKGROUND OF THE INVENTION (a) Field of the Invention

The present invention relates to a plasma display and a driving method thereof. More particularly, the present invention relates to a plasma display having a contact detection function and a driving method thereof.

(b) Description of the Related Technology

A plasma display is a display device that uses a plasma display panel (PDP) for displaying characters or images using plasma generated by a gas discharge.

The plasma display divides one frame into a plurality of subfields each having a luminance weight value and drives the subfields. A cell is initialized by a reset discharge during a reset period of each subfield, and a light emitting cell and a non-light emitting cell are selected by an address discharge during an address period. A sustain discharge occurs a number of times corresponding to a weight value of a corresponding subfield in the light emitting cell during a sustain period to display an image.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

One aspect of the invention is a plasma display and a driving method thereof having advantages of implementing a contact detection function in plasma display panel (PDP) without increasing the volume of the plasma display panel.

Another aspect of the invention is a method of driving a plasma display including a plurality of discharge cells and driven by dividing one frame into a plurality of subfields having weight values. The method of driving the plasma display may include the steps of: dividing one screen into a plurality of areas including a plurality of discharge cells; displaying a detection image in the plurality of areas; receiving an external detection image of a contact object area among the plurality of areas through a contact device; detecting an area having an image the same as the detection image of the contact object area among the plurality of areas in which the detection image is displayed; and determining a position of the contact object area from a position of the detected area.

Another aspect of the present invention is a plasma display including a plurality of discharge cell, a driver, and a controller. The driver may display a detection image through the plurality of discharge cells. The controller may divide one frame into a plurality of subfields, divide the plurality of discharge cells into a plurality of areas, have position data corresponding to the plurality of areas, and detect position data of an area having an image the same as a detection image of a contact object area received through a contact device among the plurality of areas in which the detection image is displayed. At this time, the controller may determine a position of the contact object area from the detected position data.

Another aspect of the present invention is a contact device of a plasma display including a plasma display panel, in which a plurality of discharge cells are formed, and driven by dividing one frame into a plurality of subfields, the contact device. The contact device may include an image detector and a transmitter. The image detector may detect a detection image of a contact object area while the detection image is displayed in a plurality of areas each including at least one discharge cell among the plurality of discharge cells. The transmitter may transmit the detection image of the contact object area to a controller controlling the operation of the plasma display panel. At this time, a position of an area having an image the same as the detection image of the contact object area among the plurality of areas in which the detection image is displayed may be determined as a position of the contact object area.

Another aspect of the invention is a method of driving a plasma display including a plurality of discharge cells and driven by dividing one frame into a plurality of subfields having weight values, the method comprising: dividing one screen into a plurality of areas, wherein each of the areas corresponds to at least one of the plurality of discharge cells, and wherein the plurality of areas form a detection pattern; displaying the detection pattern in the plasma display; receiving a detection image which has been previously detected or captured by a contact device, wherein the detection image corresponds to at least one of the plurality of areas; comparing the received detection image with the detection pattern; and determining a position of the at least one area detected or captured by the contact device based on the comparison.

In the above method, the displaying comprises: dividing the plurality of subfields into a first subfield group and a second subfield group; generating subfield data indicating light emission or non-light emission in the plurality of subfields from image data corresponding to the discharge cells; changing the subfield data corresponding to the subfields of the first subfield group to image data for the detection pattern; and sustain-discharging the plurality of discharge cells based on the changed subfield data of the first subfield group.

In the above method, weight values of the subfields of the first subfield group are smaller than those of the subfields of the second subfield group. In the above method, the image data for the detection pattern comprises different image values for the plurality of areas, respectively. In the above method, the image data for the detection pattern is compared with the received detection image, and wherein the determined position is the area which has the same image value as that of the received detection image.

Another aspect of the invention is a plasma display comprising: a display panel; a driver configured to display a detection pattern in the display panel; and a controller configured to: i) divide one screen image, displayed in the display panel, into a plurality of areas, wherein each of the areas corresponds to at least one of a plurality of discharge cells in the display panel, and wherein the plurality of areas form the detection pattern, ii) receive a detection image which has been previously detected by a contact device and corresponds to at least one of the plurality of areas, iii) compare the received detection image with the detection pattern and iv) determine a position of the at least one area detected by the contact device based on the comparison.

In the above display, the controller comprises: a subfield data generator configured to generate subfield data indicating light emission or non-light emission in the plurality of subfields from image data for the discharge cells; and a subfield data changer configured to i) divide the plurality of subfields into a first subfield group and a second subfield group and ii) change the subfield data corresponding to the subfields of the first subfield group to image data for the detection pattern.

In the above display, the controller further comprises: a screen load ratio calculator configured to calculate a screen load ratio using the image data of the plurality of discharge cells; and a sustain discharge allocator configured to i) determine a total number of sustain discharges allocated to one frame using the screen load ratio and ii) allocate the total number of sustain discharges to each subfield, wherein the driver is further configured to sustain-discharge the plurality of discharge cells based on the subfield data and the number of sustain discharges allocated to each subfield.

In the above display, the image data for the detection pattern comprises different image values for the plurality of areas, respectively. In the above display, the image data for the detection pattern is compared with the received detection image, and wherein the determined position is the area which has the same image value as that of the received detection image.

Another aspect of the invention is a contact device for a plasma display including a plasma display panel, in which a plurality of discharge cells are formed, and driven by dividing one frame into a plurality of subfields, the contact device comprising: an image detector configured to detect at least one of a plurality of areas displayed in the plasma display, wherein each of the areas corresponds to at least one of the plurality of discharge cells, and wherein the plurality of areas form a detection pattern; and a transmitter configured to transmit the detected image to the plasma display which is configured to determine a position of the at least one area detected by the image detector based on the transmitted detected image and the detection pattern.

In the above device, the plurality of subfields are divided into a first subfield group including at least one subfield and a second subfield group including at least one subfield having a weight value greater than that of the subfield of the first subfield group, subfield data indicating light emission or non-light emission in the plurality of subfields is generated by the controller from image data corresponding to the discharge cells, and subfield data corresponding to the subfield of the first subfield group is changed to image data for the detection pattern.

In the above device, the image data for the detection pattern comprises different image values for the plurality of areas, respectively. The above device further comprises a switch configured to select activation or deactivation for the detection, wherein the transmitter is configured to transmit a detection control signal to the controller only when the contact is activated, and wherein the detection signal is configured to be displayed in the plurality of areas based on the detection control signal. In the above device, the image detector comprises a charge coupled device (CCD) or a complementary metal oxide semi-conductor (CMOS).

Still another aspect of the invention is a method of driving a plasma display, comprising: storing a detection pattern, which is formed by dividing one screen image, displayed in the plasma display, into a plurality of areas which corresponds to a plurality of discharge cells of the plasma display, respectively; displaying the detection pattern in the plasma display; receiving a detection image which has been previously detected or captured and corresponds to one of the plurality of areas; comparing the received detection image with the detection pattern; and determining a position of the detected or captured area based on the comparison.

In the above method, each of the plurality of areas of the detection pattern has a unique image value, wherein the detection image has an image value, wherein the image value of the detection image is compared with the unique image values, and wherein the determined position is the area which has the same image value as that of the received detection image.

The above method further comprises dividing one frame into a plurality of subfields having weight values, wherein the detection pattern is displayed via at least one of the subfields and is not readily visible to a viewer. In the above method, the detection image is received from a contact device which has captured the one area of the detection pattern.

BRIEF DESCRIPTION OF THE DRAWINGS

FIG. 4 is a diagram showing an example of a detection image (or detection pattern) displayed on a screen.

DETAILED DESCRIPTION OF CERTAIN INVENTIVE EMBODIMENTS

Figures 1, 2:
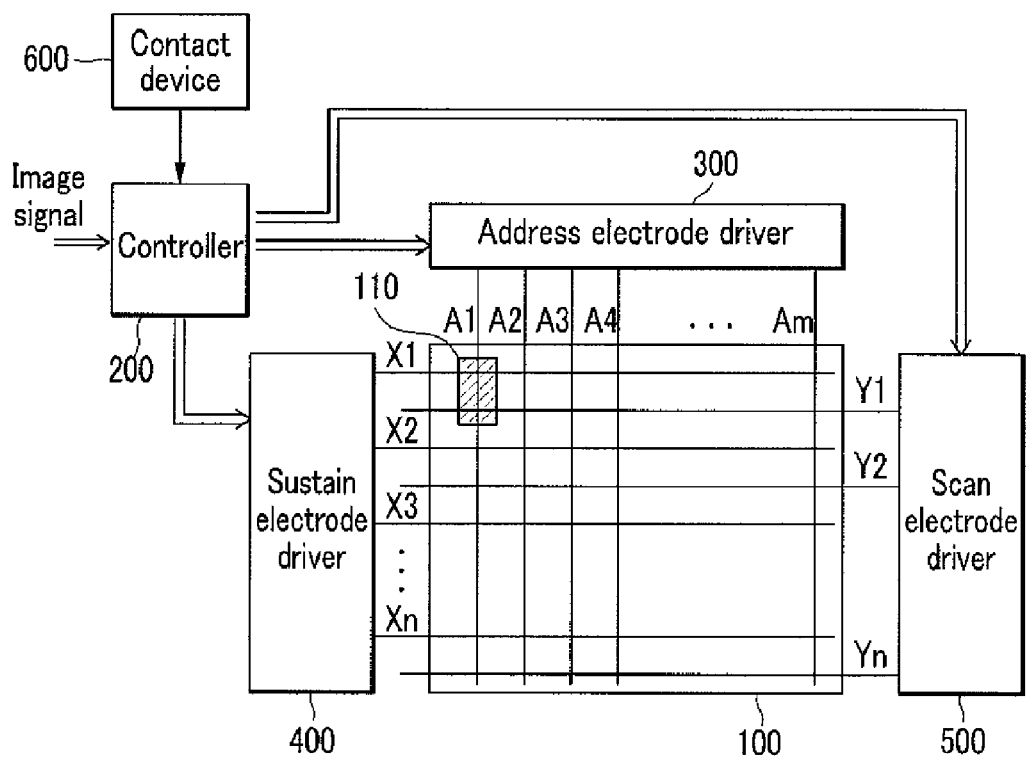
FIG. 1 is a schematic diagram showing a plasma display in accordance with an exemplary embodiment of the present invention.
FIG. 2 is a diagram showing a subfield arrangement in accordance with an exemplary embodiment of the present invention.

The plasma display panel of the plasma display is used as an input device capable of inputting data through direct contact by a hand or with a pen. Infrared rays may be used to implement a contact detection function in the plasma display panel. As such, in order to implement the contact detection function in the plasma display panel, it may be necessary to additionally provide an infrared source irradiating infrared rays and an infrared sensor detecting infrared rays in the plasma display panel.

Moreover, in order to implement a stable contact detection function in the plasma display panel, it may be necessary to uniformly irradiate an appropriate amount of infrared rays. Here, in order to uniformly irradiate an appropriate amount of infrared rays, a plurality of infrared sources may be provided in the plasma display or a single infrared source may be disposed away from an object. However, the above two methods increase the volume of the plasma display device and manufacturing costs.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In addition, wall charges mentioned in the following description mean charges formed and accumulated on a wall (e.g., a dielectric layer) close to an electrode of a discharge cell. Although the wall charges do not actually touch the electrodes themselves, the wall charges will be described as being "formed" or "accumulated" on the electrode. Further, a wall voltage means a potential difference formed on the wall of the discharge cell by the wall charge.

Hereinafter, a plasma display and a driving method thereof in accordance with exemplary embodiments of the present invention will be described in detail with reference to the accompanying drawings.

Figure 3:
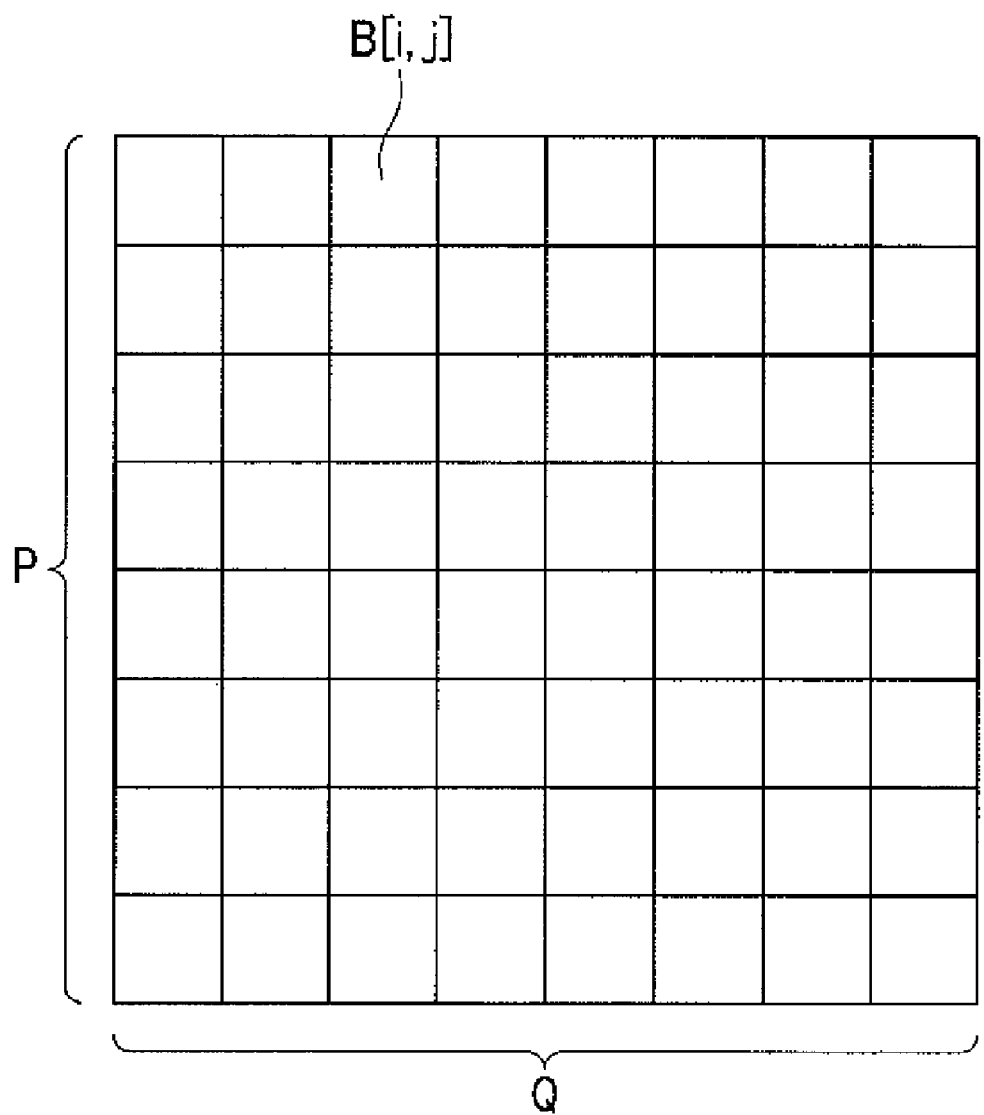
FIG. 3 is a diagram showing a divided screen in accordance with an exemplary embodiment of the present invention.

FIG. 1 is a schematic diagram showing a plasma display in accordance with an exemplary embodiment of the present invention, and FIG. 2 is a diagram showing a subfield arrangement in accordance with an exemplary embodiment of the present invention. Further, FIG. 3 is a diagram showing a divided screen in accordance with an exemplary embodiment of the present invention, and FIG. 4 is a diagram showing an example of a detection image (or detection pattern) displayed on a screen.

In one embodiment, as shown in FIG. 1, the plasma display in accordance with an exemplary embodiment of the present invention includes a plasma display panel (PDP) 100, a controller 200, an address electrode driver 300, a sustain electrode driver 400 and a scan electrode driver 500.

Figure 11:
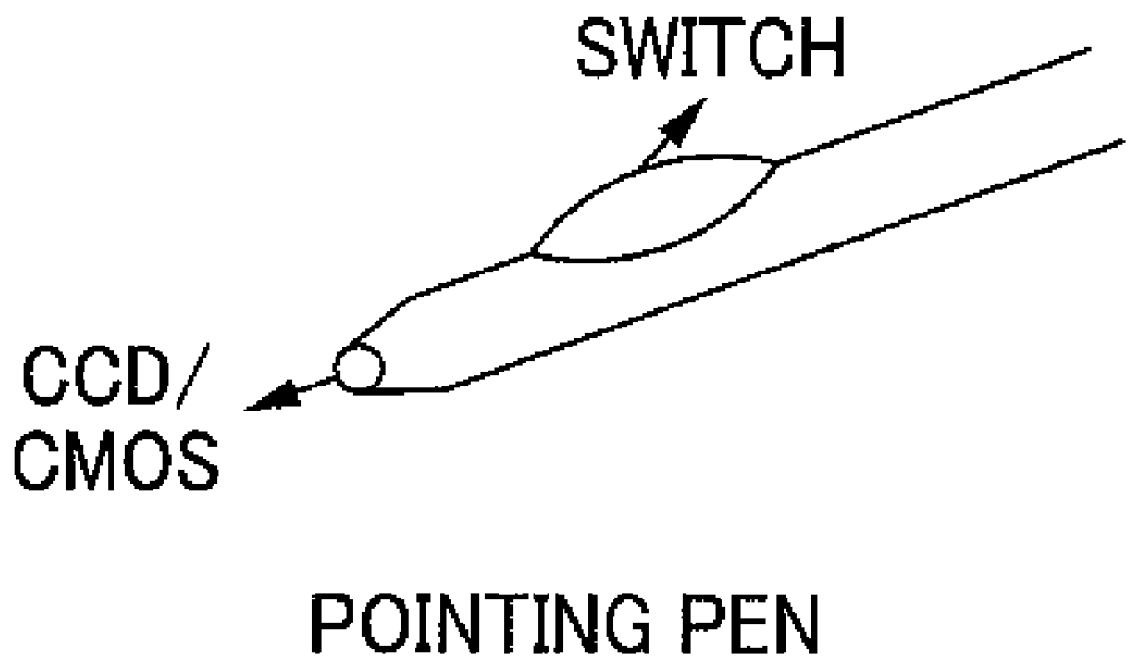
FIG. 11 is an exemplary diagram showing a contact device according to one embodiment of the present invention.

A contact device 600 may be made in the form of a pen, as shown in FIG. 11. The contact device 600 may detect an image of an area (interchangeably used with a contact area) of a detection pattern (to be described later) displayed in the PDP 100. The detection may be made through either direct contact or non-contact between the contact device 600 and the PDP 100. In one embodiment, the contact device 600 may be connected to and/or may be part of the plasma display. Further, the contact device 600 may be a separate device which wirelessly transmits a captured image to the plasma display.

The plasma display panel 100 includes a plurality of address electrodes (hereinafter, referred to as "A electrode") A1 to Am extending in a column direction, and a plurality of sustain electrodes and scan electrodes (hereinafter, referred to as "X electrode" and "Y electrode", respectively) X1 to Xn and Y1 to Yn in pairs extending in a row direction. The sustain electrodes X1 to Xn are formed to correspond to the scan electrodes Y1 to Yn, and the X electrodes X1 to Xn and the Y electrodes Y1 to Yn perform a display operation during a sustain period in order to display an image. The Y electrodes Y1 to Yn and the X electrodes X1 to Xn are disposed to intersect the A electrodes A1 to Am. A discharge space formed at each intersection of the A electrodes A1 to Am and the X and Y electrodes X1 to Xn and Y1 to Yn forms a discharge cell (hereinafter, referred to as a "cell") 110. This is an exemplary structure of the PDP 100 and panels of other structures can be applied to embodiments of the present invention.

The controller 200 receives detection image data (interchangeably used with a detection pattern or image data for the detection pattern) and actual image data from the outside (e.g., a device external to the plasma display or an element of the plasma display external to the controller 200). The controller 200 also generates an A electrode driving control signal, an X electrode driving control signal, and a Y electrode driving control signal. Further, The controller 200 outputs the generated driving control signals to the address electrode driver 300, the sustain electrode driver 400, and the scan electrode driver 500, respectively.

As shown in FIG. 2, the controller 200 divides one frame into a plurality of subfields SF1 to SF11 having weight values and displays an image by a combination of the weight values of the subfields SF1 to SF11. Each of the subfields SF1 to SF11 includes an address period and a sustain period. FIG. 2 shows one frame composed of 11 subfields SF1 to SF11 having weight values of 1, 2, 3, 5, 8, 12, 19, 28, 40, 59, and 78 to display a grayscale from 0 to 255.

Figure 10:
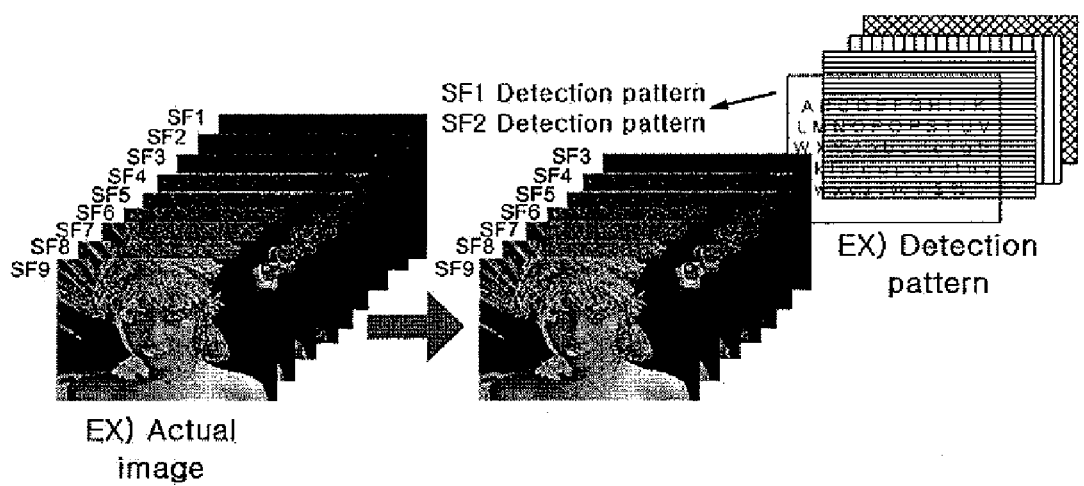
FIG. 10 is a conceptual diagram showing how to insert a detection pattern into a plurality of subfields.

The controller 200 may divide the plurality of subfields SF1 to SF11 into a low grayscale group G1 and a non-low grayscale group G2. The plurality of subfields SF1 to SF11 form one frame. As shown in FIG. 2, the low grayscale group G1 includes the subfields SF1 to SF2 and the non-low grayscale group G2 includes the subfields SF3 to SF11. The controller 200 may display a detection pattern, such as FIG. 3 or 10, capable of detecting a position of the area captured by the contact device, based on the detection image data received from the contact device 600. In one embodiment, the detection pattern is displayed, as shown in FIG. 10, using the subfields SF1 and SF2 of the low grayscale group G1 and may not be visible (or may not be at least readily visible) to a viewer. In another embodiment, the detection pattern may be displayed by subfields other than SF1 and SF2, or in combination with i) at least one of SF1 and SF2 and ii) at least one of the remaining subfields. In this embodiment, the detection pattern may be at least slightly visible to a viewer, for example, so as not to affect the display quality of the actual image. In one embodiment, the plasma display may store the detection pattern. The controller 200 may display an actual image from the actual image data using the subfields SF3 to SF11 of the non-low grayscale group G2.

As shown in FIG. 3, the controller 200 divides one screen into a plurality of areas (B[i,j]) and stores position data corresponding to images of the areas (B[i,j]). In FIG. 3, it is assumed that one screen is divided into a P×Q matrix such that P*Q areas (B[i,j]) are provided on one screen in which n/P cells (not shown) are arranged in the row direction and m/Q cells (not shown) are arranged in the column direction. Here, i represents an integer between 1 and P and j represents an integer between 1 and Q. In this case, each area (B[i,j]) of the detection pattern may have a different image value as shown in FIG. 4.

In one embodiment, since the images displayed in the plurality of areas (B[i,j]) are different from each other, the controller 200 determines a position of a contact object area by comparing an image of the contact area received from the contact device 600 with the image of the detection pattern displayed in the plurality of areas (B[i,j]) by the subfields SF1 and SF2 of the low grayscale group G1.

Referring back to FIG. 1, the address electrode driver 300, the sustain electrode driver 400, and the scan electrode driver 500 apply driving voltages to the A electrode A1 to Am, the X electrode X1 to Xn, and the Y electrode Y1 to Yn based on the driving control signals output from the controller 200.

In detail, the address electrode driver 300, the sustain electrode driver 400, and the scan electrode driver 500 select light emitting cells and non-light emitting cells from the plurality of cells 110 through an address discharge during the address period of each of the subfields SF1 to SF11. Then, the sustain electrode driver 400 and the scan electrode driver 500 apply sustain pulses having opposite phases to the X electrode X1 to Xn and the Y electrode Y1 to Yn a number of times corresponding to a weight value of a corresponding subfield during the sustain period of each of the subfields SF1 to SF11. Thus, the sustain discharge repeatedly occurs a number of times corresponding to a weight value of a corresponding subfield in the discharge cell emitting light in each of the subfields SF1 to SF11. At this time, the sustain pulse may be applied to any one of the X electrode X1 to Xn and the Y electrode Y1 to Yn, and the other electrode may be biased at a constant voltage.

Figure 5:
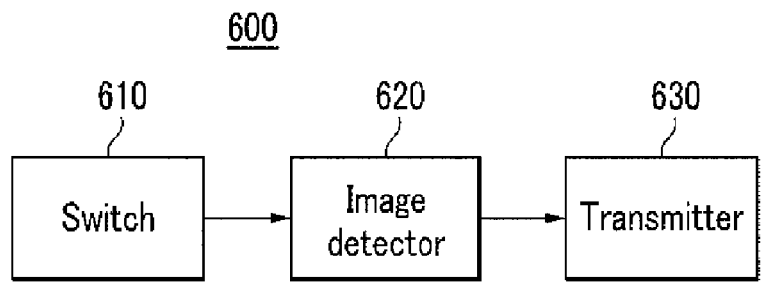
FIG. 5 is a schematic block diagram of a contact device of FIG. 1.

The contact device 600 detects (e.g., captures) an image of a contact object area from the detection pattern displayed in the PDP 100 and transmits image data corresponding to the detected image to the controller 200. In one embodiment, a user may point the contact device 600 to an area of the PDP screen (where the detection pattern is displayed) and detects or captures the image of the area. In one embodiment, the captured image may be automatically transmitted to the PDP display so that the PDP display timely detects the area selected by the user. FIG. 5 is a schematic block diagram of the contact device of FIG. 1, and FIG. 6 is a flowchart showing an operation of the contact device of FIG. 1.

As shown in FIG. 5, the contact device 600 includes a switch 610, an image detector 620, and a transmitter 630.

The switch 610 includes an on/off button for selecting activation or deactivation for a contact. When a user presses an on button, the activation for the contact is made and, when the user presses an off button, the deactivation for the contact is made.

Figure 6:
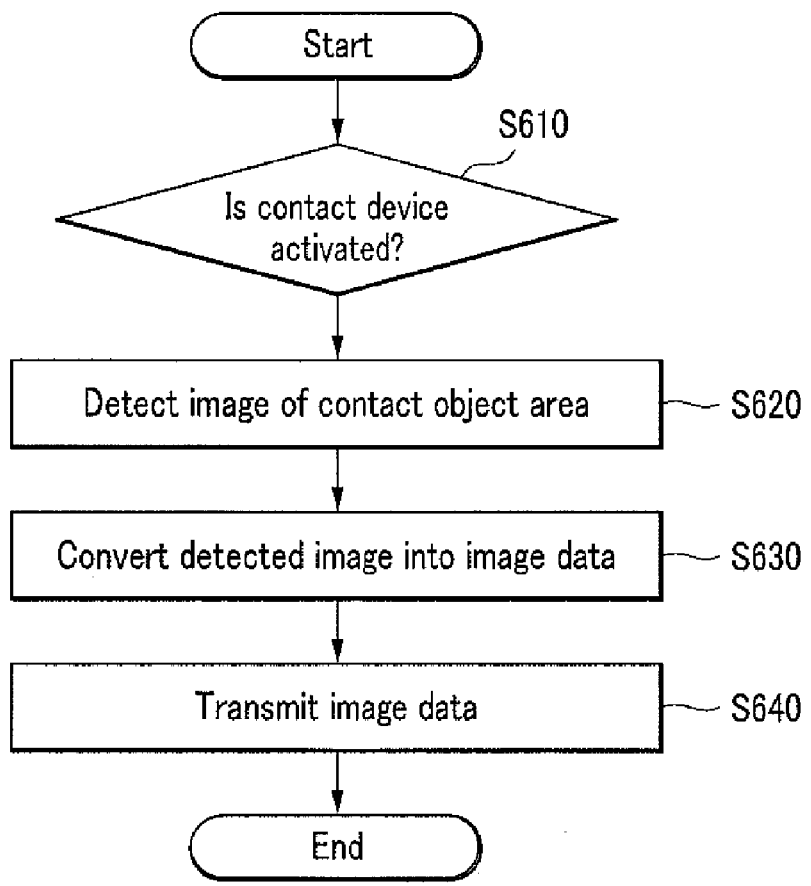
FIG. 6 is a flowchart showing an operation of the contact device of FIG. 1.

As shown in FIG. 6, the image detector 620 determines whether the contact device 600 is activated for the contact (S610). In the case where the activation is made, the image detector 620 detects or captures an image of a contact area displayed in a plurality of areas on a screen, for example, by the subfields SF1 and SF2 of the low grayscale group G1 (S620), and converts the taken image into image data (S630). The image detector 620 includes an image sensor (not shown) for detecting an image such as a charge coupled device (CCD) or a complementary metal oxide semi-conductor (CMOS).

In one embodiment, the contact device may communicate data with the PDP display so that the detection pattern may be displayed while the switch 610 is turned on. In another embodiment, the detection pattern may be continuously displayed as long as the PDP display is turned on.

The transmitter 630 transmits the image data of the taken area to the controller 200 (S640).

Next, a method of determining a position of a contact area in the plasma display in accordance with an exemplary embodiment of the present invention will be described in detail with reference to FIGS. 7 to 9.

Figure 7:
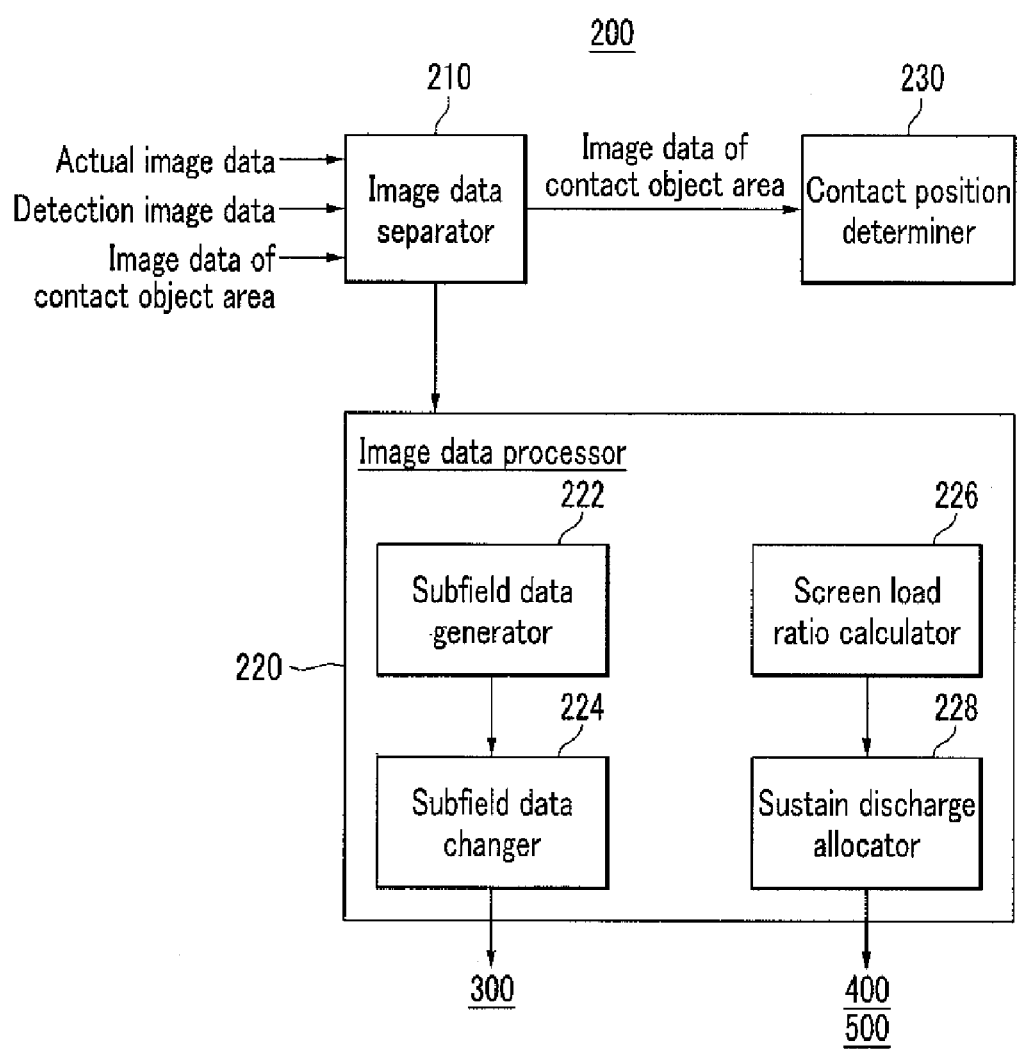
FIG. 7 is a schematic block diagram showing a controller in accordance with an exemplary embodiment of the present invention.
Figure 8:
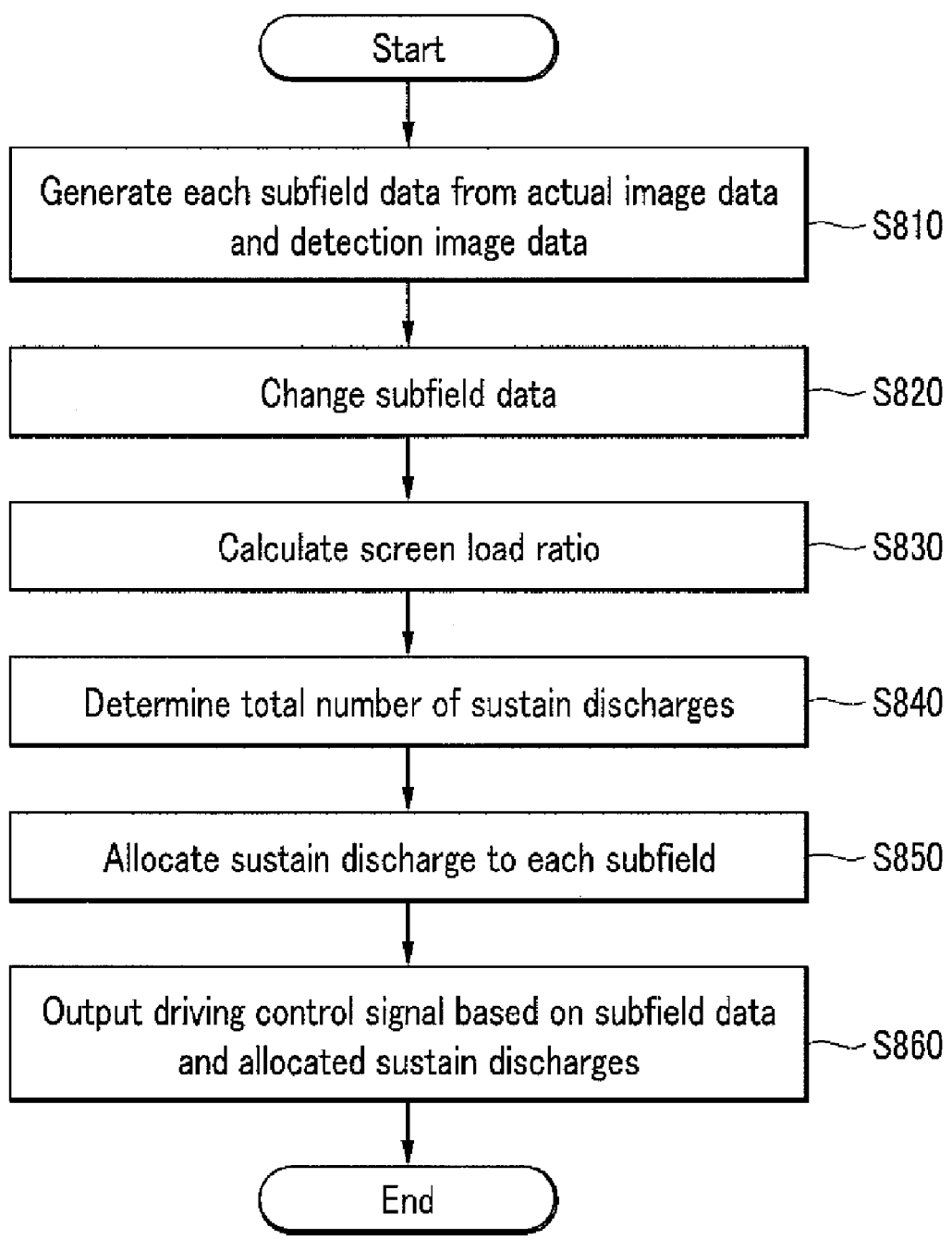
FIG. 8 is a diagram showing a method of processing image data performed by the controller in accordance with an exemplary embodiment of the present invention.

FIG. 7 is a schematic block diagram showing a controller in accordance with an exemplary embodiment of the present invention, and FIG. 8 is a diagram showing a method of processing image data performed by the controller in accordance with an exemplary embodiment of the present invention. FIG. 9 is a flowchart showing a method of determining a position of a contact object area performed by the controller in accordance with an exemplary embodiment of the present invention.

As shown in FIG. 7, the controller 200 includes an image data separator 210, an image data processor 220, and a contact position determiner 230.

The image data separator 210 receives actual image data corresponding to one frame, detection image data, and image data of a contact area from the outside, transmits the actual image data and the detection image data to the image data processor 220, and transmits the image data of the contact area to the contact position determiner 230.

The image data processor 220 includes a subfield data generator 222, a subfield data changer 224, a screen load ratio calculator 226, and a sustain discharge allocator 228.

As shown in FIG. 8, the subfield data generator 222 generates subfield data indicating light emission or non-light emission in a plurality of subfields SF1 to SF11 for a plurality of cells 110 from the actual image data input during one frame and the detection image data (S810). When a grayscale of the image data is 120, subfield data of "10011011010" may be generated from the weight values of the respective subfields SF1 to SF11. Here, the data "10011011010" sequentially correspond to the plurality of subfields SF1 to SF11, in which '1' indicates that a discharge cell emits light in a corresponding subfield and '0' indicates that a discharge cell does not emit light in a corresponding subfield. The detection image data in accordance with an exemplary embodiment of the present invention is the image data that can be displayed in the subfields SF1 and SF2 of the low grayscale group G1 and, for example, subfield data corresponding to the subfields SF3 to SF11 of the non-low grayscale group G2 is the image data corresponding to "0".

The subfield data changer 224 changes the subfield data corresponding to the subfields SF1 and SF2 of the low grayscale group G1 generated from the actual image data to the subfield data corresponding to the subfields SF1 and SF2 of the low grayscale group G1 generated from the detection image data (S820).

The screen load ratio calculator 226 calculates a screen load ratio from the actual image data corresponding to one frame (S830). For example, the screen load ratio calculator 226 may calculate the screen load ratio with an average signal level of the image data of one frame.

The sustain discharge allocator 228 determines a total number of sustain discharges to be allocated to one frame based on the calculated screen load ratio and allocates the total number of sustain discharge allocated to one frame to the respective subfields SF1 to SF11 in accordance with the weight value of each subfield (S850). In this case, the sustain discharge allocator 228 may store the total number of sustain discharges based on the screen load ratio in the form of a lookup table or calculate the total number of sustain discharges by performing a logic operation on the data corresponding to the screen load ratio. In this manner, in the case where the number of discharge cells emitting light is large as the screen load ratio is high, it is possible to prevent an increase in power consumption by reducing the total number of sustain discharges.

Subsequently, the subfield data changer 224 outputs a driving control signal based on the changed subfield data to the address electrode driver 300, and the sustain discharge allocator 228 outputs a driving control signal based on the number of sustain discharges allocated to the respective subfields to the sustain electrode driver 400 and the scan electrode driver 500 (S860). Then, the address electrode driver 300 selects a light emitting cell and a non-light emitting cell from the plurality of cells based on the driving control signal from the subfield data changer 224, and the sustain electrode driver 400 and the scan electrode driver 500 sustain-discharge the light emitting cells of the corresponding number based on the driving control signal from the sustain discharge allocator 228. Accordingly, the detection pattern may be displayed by the subfields SF1 and SF2 of the low grayscale group G1, and the actual image may be displayed by the subfields SF3 to SF11 of the non-low grayscale group G2. However, as discussed above, the invention is not limited thereto.

Figure 9:
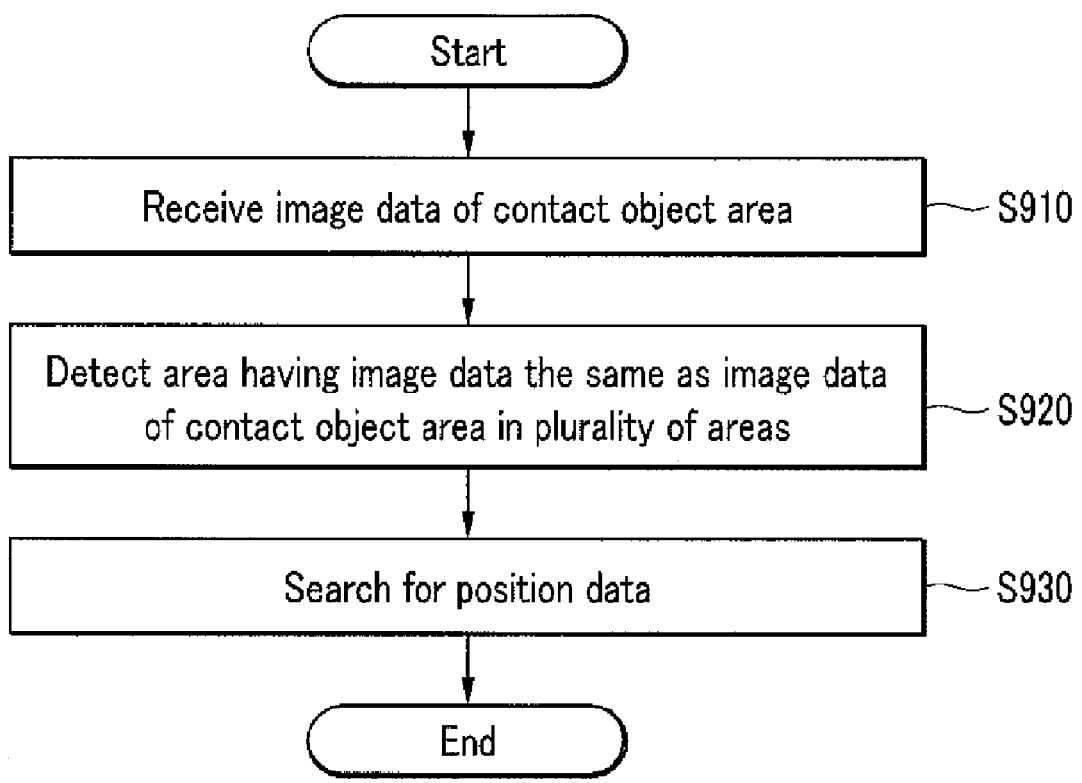
FIG. 9 is a flowchart showing a method of determining a position of a contact object area performed by the controller in accordance with an exemplary embodiment of the present invention.

Referring to FIGS. 8 and 9, when image data of a contact area is received, the contact position determiner 230 detects an area having image data the same as the image data of the contact object area received from the contact device 600 in the plurality of areas (B[i,j]) in which the detection image data is displayed (S920). Subsequently, the contact position determiner 230 searches for position data corresponding to the detected area (S930). The position data searched in the above manner corresponds to the position of the contact object area input from the contact device.

In one embodiment, only in the case where the contact is activated by the switch 610 of the contact device 600, the transmitter 630 transmits a detection control signal to the controller 200 and, only in the case where the controller 200 receives the detection control signal, the subfield data of the low grayscale group G1 may be changed to the detection image data. Accordingly, the address electrode driver 300, the sustain electrode driver 400, and the scan electrode driver 500 may sustain-discharge the plurality of discharge cells during the sustain period of each subfield, and the image detector 620 of the contact device 600 may detect the image of the contact object area while the discharge cells are sustain-discharged during the sustain period of each subfield. In this case, the detection control signal may include the detection image data and/or data starting contact detection operation.

According to at least one embodiment of the present invention, it is possible to implement a contact detection function in a plasma display panel without increasing the volume of the plasma display device While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of driving a plasma display including a plurality of discharge cells and driven by dividing one frame into a plurality of subfields having weight values, the method comprising:
dividing one screen into a plurality of areas, wherein each of the areas corresponds to at least one of the plurality of discharge cells, and wherein the plurality of areas form a detection pattern;
displaying the detection pattern in the plasma display;
receiving a detection image which has been previously detected or captured by a contact device, wherein the detection image corresponds to at least one of the plurality of areas;
comparing the received detection image with the detection pattern; and
determining a position of the at least one area detected or captured by the contact device based on the comparison.

2. The method of claim 1, wherein the displaying comprises:
dividing the plurality of subfields into a first subfield group and a second subfield group;
generating subfield data indicating light emission or non-light emission in the plurality of subfields from image data corresponding to the discharge cells;
changing the subfield data corresponding to the subfields of the first subfield group to image data for the detection pattern; and
sustain-discharging the plurality of discharge cells based on the changed subfield data of the first subfield group.

3. The method of claim 2, further comprising:
calculating a screen load ratio from the image data of the plurality of discharge cells;
determining a total number of sustain pulses during one frame based on the screen load ratio;
allocating a sustain pulse to each subfield from the total number of sustain pulses; and
sustain-discharging the plurality of discharge cells based on the sustain pulse allocated to each subfield.

4. The method of claim 3, wherein weight values of the subfields of the first subfield group are smaller than those of the subfields of the second is subfield group.

5. The method of claim 2, wherein the image data for the detection pattern comprises different image values for the plurality of areas, respectively.

6. The method of claim 5, wherein the image data for the detection pattern is compared with the received detection image, and wherein the determined position is the area which has the same image value as that of the received detection image.

7. A plasma display comprising:
a display panel;
a driver configured to display a detection pattern in the display panel; and
a controller configured to: i) divide one screen image, displayed in the display panel, into a plurality of areas, wherein each of the areas corresponds to at least one of a plurality of discharge cells in the display panel, and wherein the plurality of areas form the detection pattern, ii) receive a detection image which has been previously detected by a contact device and corresponds to at least one of the plurality of areas, iii) compare the received detection image with the detection pattern and iv) determine a position of the at least one area detected by the contact device based on the comparison.

8. The plasma display of claim 7, wherein the controller comprises:
a subfield data generator configured to generate subfield data indicating light emission or non-light emission in the plurality of subfields from image data for the discharge cells; and
a subfield data changer configured to i) divide the plurality of subfields into a first subfield group and a second subfield group and ii) change the subfield data corresponding to the subfields of the first subfield group to image data for the detection pattern.

9. The plasma display of claim 8, wherein the controller further comprises:
a screen load ratio calculator configured to calculate a screen load ratio using the image data of the plurality of discharge cells; and
a sustain discharge allocator configured to i) determine a total number of sustain discharges allocated to one frame using the screen load ratio and ii) allocate the total number of sustain discharges to each subfield,
wherein the driver is further configured to sustain-discharge the plurality of discharge cells based on the subfield data and the number of sustain discharges allocated to each subfield.

10. The plasma display of claim 8, wherein the image data for the detection pattern comprises different image values for the plurality of areas, respectively.

11. The plasma display of claim 7, wherein the image data for the detection pattern is compared with the received detection image, and wherein the determined position is the area which has the same image value as that of the received detection image.

12. A contact device for a plasma display including a plasma display panel, in which a plurality of discharge cells are formed, and driven by dividing one frame into a plurality of subfields, the contact device comprising:
   an image detector configured to detect at least one of a plurality of areas displayed in the plasma display, wherein each of the areas corresponds to at least one of the plurality of discharge cells, and wherein the plurality of areas form a detection pattern; and
   a transmitter configured to transmit the detected image to the plasma display which is configured to determine a position of the at least one area detected by the image detector based on the transmitted detected image and the detection pattern.

13. The contact device of claim 12, wherein the plurality of subfields are divided into a first subfield group including at least one subfield and a second subfield group including at least one subfield having a weight value greater than that of the subfield of the first subfield group, subfield data indicating light emission or non-light emission in the plurality of subfields is generated by the controller from image data corresponding to the discharge cells, and subfield data corresponding to the subfield of the first subfield group is changed to image data for the detection pattern.

14. The contact device of claim 13, wherein the image data for the detection pattern comprises different image values for the plurality of areas, respectively.

15. The contact device of claim 12, further comprising:
   a switch configured to select activation or deactivation for the detection,
   wherein the transmitter is configured to transmit a detection control signal to the controller only when the contact is activated,
   and wherein the detection signal is configured to be displayed in the plurality of areas based on the detection control signal.

16. The contact device of claim 12, wherein the image detector comprises a charge coupled device (CCD) or a complementary metal oxide semi-conductor (CMOS).

17. A method of driving a plasma display, comprising:
   storing a detection pattern, which is formed by dividing one screen image, displayed in the plasma display, into a plurality of areas which corresponds to a plurality of discharge cells of the plasma display, respectively;
   displaying the detection pattern in the plasma display;
   receiving a detection image which has been previously detected or captured and corresponds to one of the plurality of areas;
   comparing the received detection image with the detection pattern; and
   determining a position of the detected or captured area based on the comparison.

18. The method of claim 17, wherein each of the plurality of areas of the detection pattern has a unique image value, wherein the detection image has an image value, wherein the image value of the detection image is compared with the unique image values, and wherein the determined position is the area which has the same image value as that of the received detection image.

19. The method of claim 17, further comprising dividing one frame into a plurality of subfields having weight values, wherein the detection pattern is displayed via at least one of the subfields and is not readily visible to a viewer.

20. The method of claim 17, wherein the detection image is received from a contact device which has captured the one area of the detection pattern.

* * * * *